United States Patent [19]

Fujita

[11] Patent Number: 4,968,173
[45] Date of Patent: Nov. 6, 1990

[54] UNIVERSAL JOINT

[76] Inventor: Toshiharu Fujita, 5-9-22, Yamate-Dai, Ibaraki-Shi, Osaka, Japan

[21] Appl. No.: 489,830

[22] Filed: Mar. 9, 1990

[51] Int. Cl.⁵ .............................................. F16D 3/00
[52] U.S. Cl. ........................................ 403/57; 403/74; 464/112
[58] Field of Search ................... 403/57, 58, 74, 142, 403/159; 464/112, 106, 134, 135

[56] References Cited

U.S. PATENT DOCUMENTS 3,497,248  2/1970  Teramachi ..................... 403/74 X

FOREIGN PATENT DOCUMENTS 4214012  8/1967  Japan .

Primary Examiner—Andrew V. Kundrat
Attorney, Agent, or Firm—Edwin E. Greigg

[57] ABSTRACT

A universal joint includes a first shaft member having a cylindrical portion, a pair of yoke portions at a free end thereof and a ball-like portion formed between the yoke portions and a second shaft member having a cylindrical portion and a pair of yoke portions at a free end thereof. The ball-like portion is formed integrally and inseparably with the yoke portions of the first shaft member. The first and second shaft members are thus detachably and movably connected with each other through engagement between the ball-like portion of the former and the yoke portions of the latter.

8 Claims, 4 Drawing Sheets

UNIVERSAL JOINT

BACKGROUND OF THE INVENTION

1. Field of the Invention

The present invention relates to a universal joint, and more particularly to a universal joint having a pair of shaft members each having a pair of yoke portions and a ball-like member to be interposed and held between the yoke portions of the shaft members, the shaft members being freely connectable and disconnectable relative to each other via the ball-like member therebetween so that the interconnected shaft members become movable relative to each other across the ball member.

2. Description of the Related Art

A universal joint of the above-noted type is known from e.g. a Japanese published utility model gazette No. 42-14012. In this universal joint, the pair of yoke portions of each shaft member form, in mutually opposing faces thereof, receiving faces together for receiving the ball member therebetween. Further, in each receiving face, there is formed a groove for permiting withdrawal of the ball member by pulling the ball member in a direction substantially normal to the rotational axis of the shaft member holding this ball member. In this way, the shaft members can be freely connected to and disconnected from each other by detaching the interconnecting ball member therebetween.

In the above-described conventional joint, the ball member is detached and attached respectively for disassembly and assembly of the joint, from the direction substantially normal to the axis of either shaft member. More particularly, for attaching the ball member, first, the ball member is inserted between the yoke portions of one shaft member from the direction substantially normal to the rotational axis of this shaft member. Second, the other shaft member is fitted to the ball member held between the yoke portions of the first-mentioned shaft member, from the direction substantially normal to the rotational axis of the other shaft member so that the ball member effects a relative sliding movement, whereby the two shaft members are movably connected with each other via the ball member therebetween.

That is, the joint assembly requires two steps of operations and the above joint consists essentially of three elements: the two identical shaft members and the ball member.

With the above art, the ball member is constructed independently of, i.e. separately from the shaft members. This can cause inconvenience that the ball member can be lost during transportation or assembly. Further, since this type of ball member is usually very small, manual assembly of the same with the shaft members tends to be troublesome.

OBJECT AND SUMMARY OF THE INVENTION

Hence, the primary object of the invention is to provide an improved universal joint which can overcome the above-noted drawbacks of the conventional joints and thus can improve the efficiency of assembly operation.

For accomplishing the above-noted object, a universal joint, according to the invention, comprises: a first shaft member having a cylindrical portion, a pair of yoke portions at a free end thereof and a ball-like portion formed between said yoke portions; and a second shaft member having a cylindrical portion and a pair of yoke portions at a free end thereof; the ball-like portion being formed integrally and inseparably with the yoke portions of the first shaft member; the ball-like portion being engageable with the yoke portions of the second shaft member for detachably and movably interconnecting the first and second shaft members.

With the above-described construction of the invention, the ball member, which is a separate entity in the conventional joint, is substituted by the ball-like portion which is formed integrally and fixedly with the first shaft member. Accordingly, there will occur no loss of the ball member or difficulty of the ball member assembly with the shaft members. Then, the invention's universal joint consists essentially of only two elements, i.e. the first shaft member having the yoke portions and the ball-like portion formed integrally of the yoke portions and the second shaft member having the yoke portions engageable with the ball-like portion of the first shaft member and the joint assembly requires only one step operation. Accordingly, the invention's joint is advantageous for facilitating assembly, reducing the cost and for improving the efficiency.

Further, if the first shaft member and the ball-like portion are formed of a same material, such integrated quality will enhance the strength and rigidity of the entire joint.

Moreover, if the integral formation of the first shaft member and the ball-like portion is effected by the powder material injection molding method, there will occur no waste in the material, whereby the production yield will be significantly improved thus further reducing the manufacture cost.

On the other hand, the ball-like portion can be constructed of a material different from that used in forming the first shaft member. This will be advantageous for providing a greater freedom in the choice of the material used for this ball-like portion and also in the designing of the joint as enabling such selection as most suitable for a particular application in consideration of the required strength or friction coefficient or compression strength. In this case also, the ball-like portion is formed integrally and inseparably with the yoke portions of the first shaft member.

According to a preferred embodiment of the invention, the second shaft member, i.e. the shaft member which does not have the ball-like portion, includes reinforcing ribs for reinforcing its yoke portions. This can further improve the strength and rigidity of the universal joint.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a universal joint relating to the present invention; in which.

DESCRIPTION OF THE PREFERRED EMBODIMENTS

Preferred embodiments of a universal joint relating to the present invention will now be described particularly with reference to the accompanying drawings.

Figure 1:
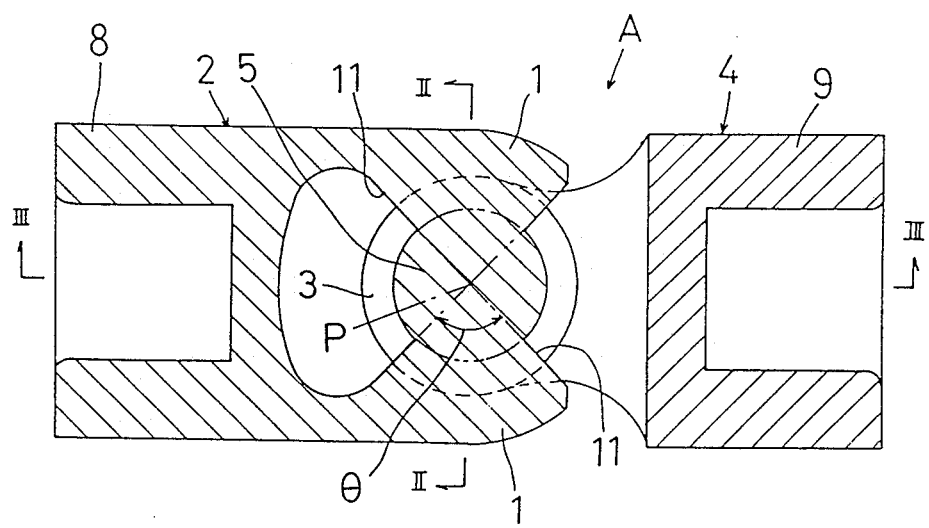
FIG. 1 is a section showing a universal joint as assembled.

Referring to FIG. 1, a universal joint includes a first shaft member 2 having a pair of yoke portions 1, 1, a cylindrical portion 8 and a ball-like portion 5 formed integrally and inseparably with the yoke portions 1, 1, and a second shaft member 4 having a pair of yoke portions 3, 3 engageable with the ball-like portion 5 and a cylindrical portion 9, with the first shaft member 2 and the second shaft member 4 being detachably and movably connected with each other through engagement between the ball-like portion 5 of the former and the yoke portions 3 of the latter. Except for the ball-like portion 5, the first and second shaft members 2 and 4 are substantially identical with each other.

Figure 4:
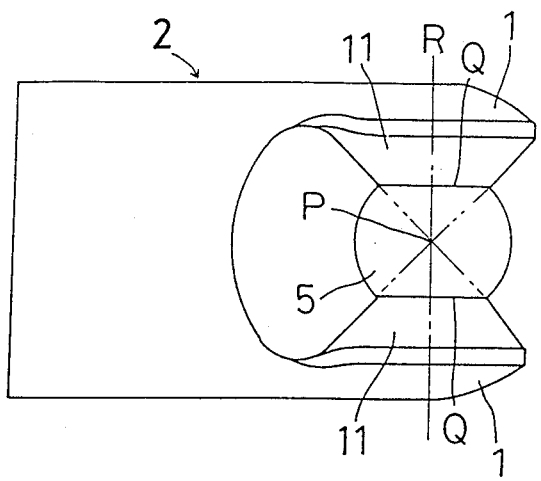
FIG. 4 is a front view of a first shaft member.
Figure 5:
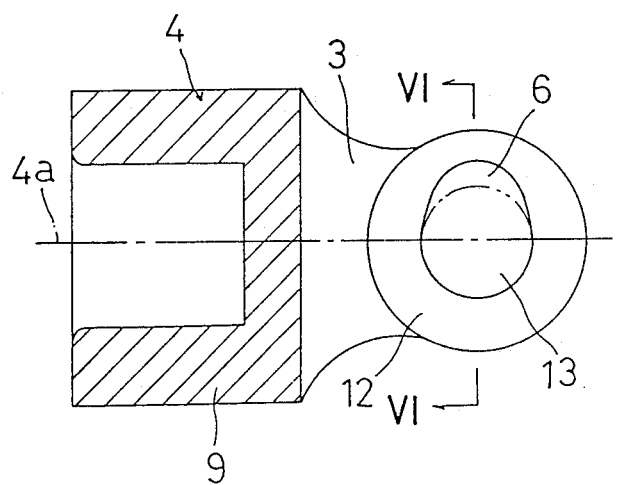
FIG. 5 is a section view of a second shaft member.
Figure 6:
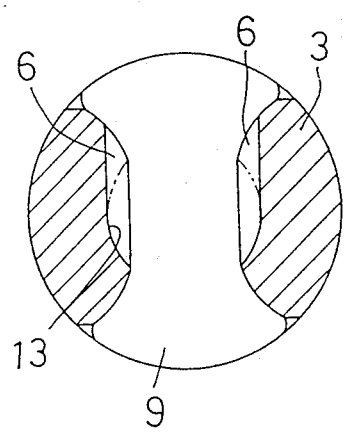
FIG. 6 is a section view taken along a line VI—VI of FIG. 5.

The respective yoke portions 1 of the first shaft member 2 include a pair of opposing base seats 11, 11 from and between which the ball-like portion 5 extends continuously. Each base seat 11 has a sloped periphery approximating a peripheral part of a truncated cone whose virtual top corresponds to a center P of the ball-like portion 5. In FIG. 1, peripheral extensions of the opposing pair of base seats 11, 11 intersect at the ball-like portion center P at an angle $\phi$ which is substantially 90 degrees. FIG. 4 is a side view showing the first shaft member 2 alone, and in this view also the intersection angle $\phi$ between the extensions of the base seats 11, 11 is shown as substantially 90 degrees. Also shown in FIG. 4, each base seat 11 and the ball-like portion 5 form a straight border line Q which extends normal to a vertical axis R extending through the center P of the ball-like portion 5 and the yoke portions 1, 1.

In the second shaft member 4, the opposing pair of the yoke portions 3, 3 include base seats 12, 12 each having a truncated cone shape, and the seats 12, 12 have recessed spherical faces 13, 13 for receiving therebetween the ball-like portion 5 of the first shaft member 2.

Figure 3:
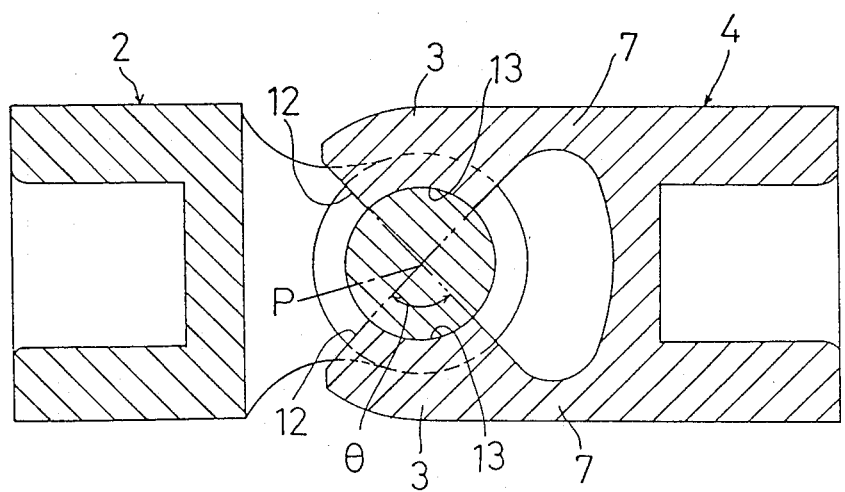
FIG. 3 is a section view taken along a line III—III of FIG. 1.
Figure 2:
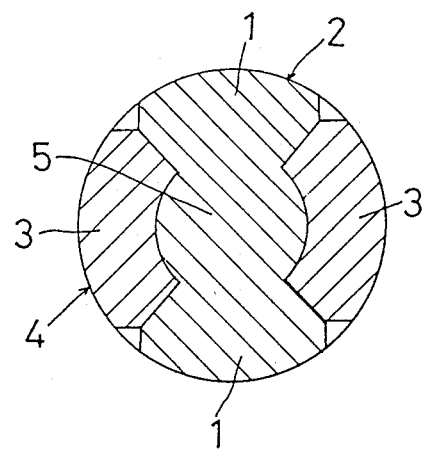
FIG. 2 is a section view taken along a line II—II of FIG. 1.

As shown in FIG. 3, virtual extensions of these conical base seats 12 and 12 of the second shaft member 4, as receiving the ball-like portion 5 of the first shaft member 2, share the same top which is the center P of the ball-like portion 5 and cross this point at an intersection angle $\phi'$ of substantially 90 degrees. Then, as shown in FIG. 2, when the first and second shaft members 2 and 4 are connected with each other, the base seats 11, 11 of the first shaft member 2 and the base seats 12, 12 of the second shaft member 5 are placed in contact with each other.

The recessed spherical faces 13, 13 of the second shaft members 4 define passage portions 6, 6 which are shaped according to a peripheral face of a virtual cylinder having the same diameter as the ball-like portion 5 of the first shaft member 2. And, these passage portions 6, 6 extend normal to an axis 4a of the second shaft member 4 so as to allow attachment and detachment of the ball-like portion 5 to and from the recessed spherical faces 13, 13.

Figure 7:
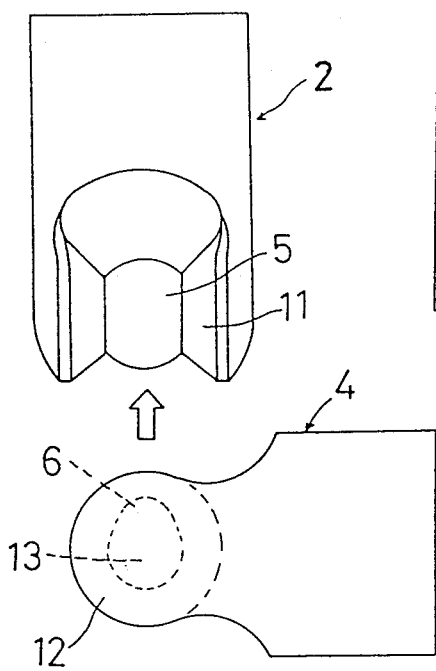
FIG. 7 is a plan view illustrating assembly procedures of the universal joint of the invention.

Next, an assembly operation of thus-constructed universal joint will be described with reference to FIG. 7.

First, the axes of the first and second shaft members 2 and 4 are aligned normal to each other. Second, the second shaft member 4 is slided to the first shaft member 2, while keeping the base seats 11, 11 of the member 2 in contact with the base seats 12, 12 of the member 5 so that the ball-like portion 5 of the first shaft member 2 may be snapped in-between the recessed spherical faces 13, 13 of the second shaft member 4 as being guided through the passage portions 6, 6. In this way, the assembly operation can be completed by the one-step operation.

Incidentally, the intersection angle of the base seats 11, 11 of the first shaft member 2 and that of the base seats 12, 12 of the second shaft member 4 can deviate slighly from precisely 90 degrees (e.g. 95 degrees or 85 degrees). What is essential is that the angles are such as to allow contact between the respective base seats 11, 11 and 12, 12 as illustrated in FIG. 2. Accordingly, if the angle $\phi'$ of the second shaft member 4 is rendered greater than the angle $\phi$ of the first shaft member 2, it becomes possible to advantageously increase the strength of roots 7 of the yoke portions 1, 1 and 3, 3 while balancing well the strengths of these yoke portions with each other.

Figure 12:
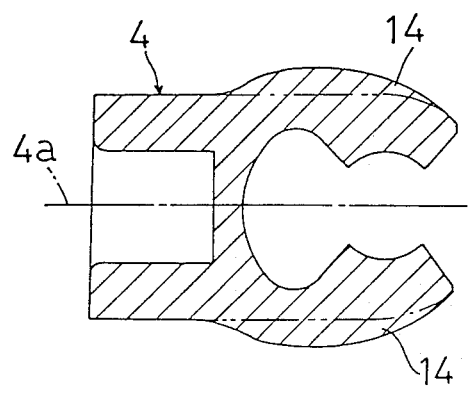
FIG. 12 is a section view showing a second shaft member with reinforcing ribs according to a still modified arrangement.
Figure 13:
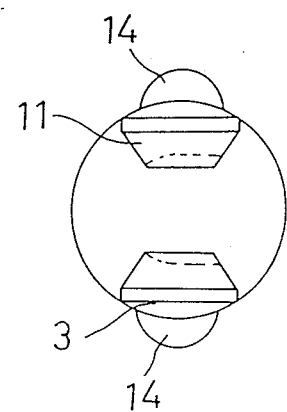
FIG. 13 is a side view of the second shaft member of FIG. 12.

For further reinforcing the yoke portions, as illustrated in FIGS. 12 and 13, it is conceivable to form ribs 14 on the outer surfaces of the yoke portions 3, 3 of the second shaft member 4 with the ribs 14 extending along the axis 4a of the second shaft member 4. This rib 14 can be configured variously. It is desired, however, that the ribs 14 should be so shaped as to extend at least over the entire roots 7 and 7 of the yoke portions 3, 3. With this, it becomes possible to effectively reinforce the yoke roots of the second shaft member 4 which is otherwise inferior to the first shaft member 2 in terms of the strength and rigidity. In this way, the entire universal joint can be reinforced while balancing the strengths of the first and second shaft members 2 and 4. Still alternately, similar ribs can be provided to the first shaft member 2 as well.

Figure 8:
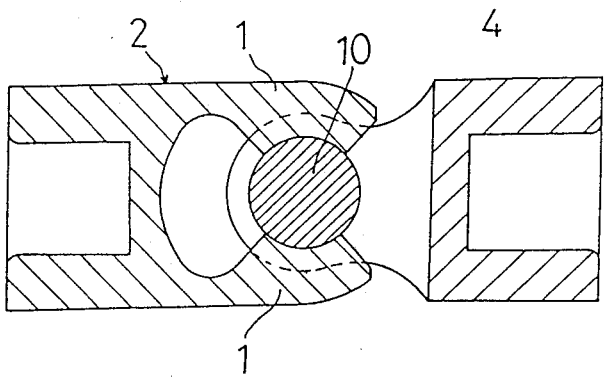
FIG. 8 is a section view showing a modified arrangement in which the first shaft member and its ball-like portion are formed of different materials.
Figure 10:
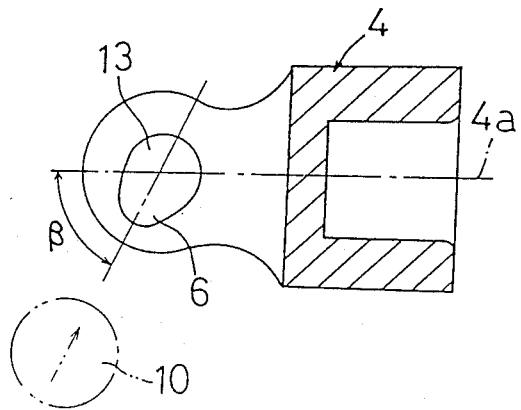
FIG. 10 is a section view showing a second shaft member according to a modified arrangement in which the extending angles of its passage portions are changed.
Figure 9:
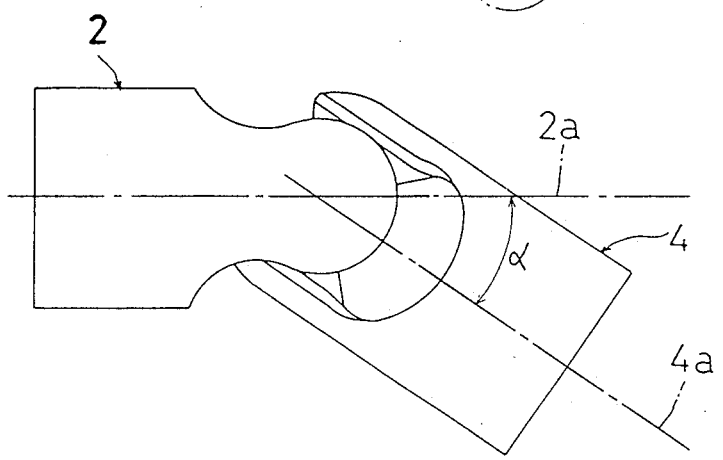
FIG. 9 is a front view of the universal joint as being flexed during an actual use.

As illustrated in FIG. 8, in place of the ball-like portion 5 formed integrally with and of the same material as the yoke portions of the first shaft member 2, a ball-like portion 10 formed of a different materal can be provided to the first shaft member 2. In this case too, however, the ball-like portion 10 is formed integrally and inseparably with the yokes of the first shaft member 2. More specifically, the ball-like portion 10 is made of a metal material, and this metal ball-like portion 10 is preliminarily placed at a predetermined position in a mold. Then, a resin material for forming the first shaft member 2 is introduced into the mold so as to form the shaft member 2 integrally and continuously with the ball-like portion 10. That is to say, what is essential in the present invention is that the ball-like portion 5 or 10 be formed integrally and inseparably with the first shaft member 2 so that the portion 5 or 10 and the member 2 are fixed to each other.

Figure 11:
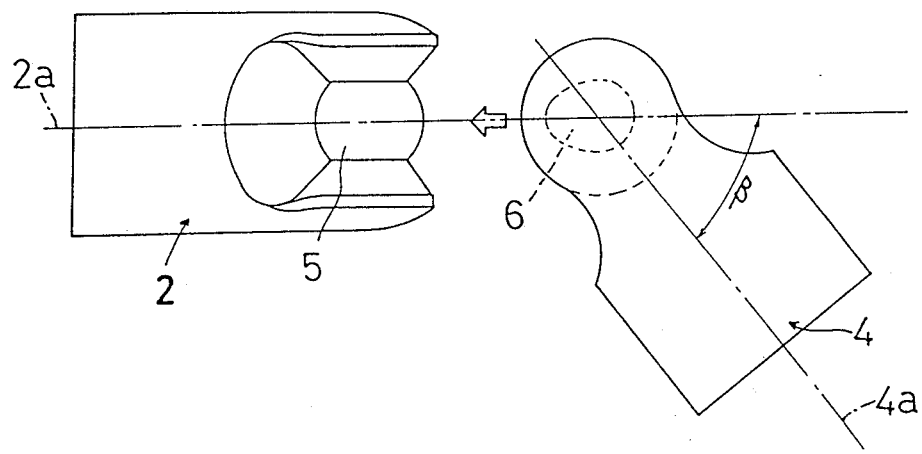
FIG. 11 is a plane view illustrating assembly procedures of a universal joint using the second shaft member of FIG. 10.

The extending direction of the passage portions 6, 6 of the second shaft member 4 can vary also. For instance, it is conceivable to arrange that an absolute maximum value of an angle $\alpha$ formed by the axis 2a of the first shaft member 2 and the axis 4a of the second shaft member 4 as the members 2 and 4 are connected with each other is rendered greater than an angle $\beta$ formed by the passage portions 6 of the second shaft member 4 and the axis 4a of this member 4. This arrangement is effective for avoiding the possibility of inadvertent disconnection between the first and second shaft members 2 and 4 during actual use of the joint. Further, in a normal use, the universal joint is flexed through such a small angle as rarely exceed 20 degrees. Then, the above arrangement makes it possible for the extending direction of the passage portions 6 to form a relatively small angle with respect to the axis 4a of the second shaft member 4. Accordingly, during the assembly operation, the first shaft member 2 and the second shaft member 4 can be held nearly horizontal relative to each other as illustrated in FIG. 11, whereby the assembly can be further facilitated. In short, the extending direction of the passage portions 6 can vary according to the intended application of the universal joint.

The first shaft member 2 can be formed by the powder material injection molding method as described below.

First, material including stainless steel powder and an appropriate binder is well kneaded so that the binder may evenly cover the particles of the steel powder. Second, the resultant mixture is granulated into pellets by using a granulating machine so as to facilitate feeding of the material into an injection molding machine. Then, this material in the form of pellets is heated and molded in a metal mold having a desired shape. The thusly molded member is heated to an appropriate temperature for eliminating the binder and then sintered. Through this sintering process, there occurs 30 through 40% volume reduction in the member thus producing a finished product. This significant amount of volume reduction makes it possible to produce a so-called near-net shaped finish product. Therefore, the finished product, produced by the above-described method, will have great precision in the dimensions and also great strength due to very close structure with a very small void ratio. Compared with other methods such as the casting or pressing, this method is advantageous for remarkably improving the yield of the production of the joints. Needless to say, the second shaft member 4 also can be manufactured by this powder material injection molding method.

Besides the stainless steel powder described in the above sample, the raw material can vary in kind according to the desired application of the universal joint. For instance, other kinds of metal powder, ceramic powder or even plastic powder can be used in certain applications. And, the method can achieve excellent yield regardless of the kind of the raw material used.

Moreover, in comparison with the conventional construction where a separate ball member is fitted to yoke portions of a shaft member from a direction substantially normal to the axis of the shaft member, if the first shaft member 2 and the ball-like portion 5 are formed completely integrally with each other or if the ribs 14 are provided for reinforcing the roots of the yoke portions 1, 3 as described in the above embodiment, there will occur no significant deterioration in the strength of the yoke roots even if the distance between these roots is made relatively small. This is because the integral ball-like portion 5 fixedly interconnects the yoke portions 1, 1 of the first shaft member 2 and also the ribs 14, 14 effectively limit outward displacement of the yoke portions 3, 3 of the second shaft member 5.

In addition to the above, the cylindrical portions of the first and second shaft members can be formed either solid or hollow.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A universal joint comprising:
   a first shaft member having a cylindrical portion, a pair of yoke portions at a free end thereof and a ball-like portion formed between said yoke portions; and
   a second shaft member having a cylindrical portion and a pair of yoke portions at a free end thereof;
   said ball-like portion being formed integrally and inseparably with said yoke portions of said first shaft member; said ball-like portion being engageable with said yoke portions of said second shaft member for detachably and movably interconnecting said first and second shaft members.

2. A universal joint as defined in claim 1, wherein said yoke portions of said first shaft member and said ball-like portion are formed of a same material.

3. A universal joint as defined in claim 1, wherein said yoke portions of said first shaft member and said ball-like portion are formed integrally with each other by the powder material injection molding method.

4. A universal joint as defined in claim 3, wherein ribs are provided to said yoke portions of said second shaft member.

5. A universal joint as defined in claim 1, wherein said yoke portions of said first shaft member and said ball-like portion are formed of different materials.

6. A universal joint as defined in claim 5, wherein ribs are provided to said yoke portions of said second shaft member.

7. A universal joint as defined in claim 2, wherein said yoke portions of said first shaft member and said ball-like portion are formed integrally with each other by the powder material injection molding method.

8. A universal joint as defined in claim 7, wherein ribs are provided to said yoke portions of said second shaft member.

* * * * *